United States Patent [19]
Winnick

[11] Patent Number: 5,618,405
[45] Date of Patent: Apr. 8, 1997

[54] REMOVAL AND RECOVERY OF HYDROGEN HALIDES USING AN ELECTROCHEMICAL MEMBRANE

[75] Inventor: Jack Winnick, Atlanta, Ga.

[73] Assignee: Georgia Tech Research Corporation, Atlanta, Ga.

[21] Appl. No.: 477,075

[22] Filed: Jun. 7, 1995

[51] Int. Cl.[6] .............................. C25B 1/24; C25B 13/04; C25B 9/00
[52] U.S. Cl. ......................... 205/763; 204/245; 204/246; 205/618; 205/619
[58] Field of Search ........................... 204/59 R, 59 AM, 204/59 F, 59 L, 128, 60, 61, 130, 245, 246, 270

[56] References Cited

U.S. PATENT DOCUMENTS

| | | | |
|---|---|---|---|
| 4,246,081 | 1/1981 | Winnick | 204/130 |
| 4,738,760 | 4/1988 | Marianowski et al. | 204/130 |
| 4,762,596 | 8/1988 | Huang et al. | 204/60 |
| 4,859,292 | 8/1989 | Appleby | 204/60 |
| 5,411,641 | 5/1995 | Trainham, III et al. | 204/59 A |

OTHER PUBLICATIONS

Yoshizawa, S., A. Takehara, Y. Ito and K. Oka; The Recovery of Chlorine from Hydrogen Chloride: Part 1: New Method Using a Molten Salt as the Electrolyte; Journal of Applied Electrochemistry 1; 245–251; (1971). No Month Available.

Yoshizawa, S., A. Takehara, Y. Ito and K. Oka; The Recovery of Chlorine from by–product Hydrogen Chloride: Part 2: Molten Metal Cathode Method; Journal of Applied Electrochemistry 1; 253–259 (1971). No Month Available.

Primary Examiner—Kathryn Gorgos
Assistant Examiner—John S. Starsiak, Jr.
Attorney, Agent, or Firm—Deveau, Colton & Marquis

[57] ABSTRACT

A method and apparatus for removing halides from high temperature gas mixtures (150°–1000° C.) using an electrochemical cell provided with inert electrodes and an electrolyte which will provide anions compatible with the halide anions formed at the anode. The electrolyte is elected to provide inert stable cations at the temperatures encountered. The gas mixture is passed by the cathode where the halides are converted to $X^-$. The anions migrate to the anode where they are converted to a stable gaseous form at much greater concentration levels. Current flow may be effected by utilizing an external source of electrical energy or by passing a reducing gas such as hydrogen past the anode.

24 Claims, 3 Drawing Sheets

BIPOLAR ARRAY FOR INDUSTRIAL APPLICATION

REMOVAL AND RECOVERY OF HYDROGEN HALIDES USING AN ELECTROCHEMICAL MEMBRANE

BACKGROUND OF THE INVENTION

1. Field of the Invention

This invention relates generally to the removal and recovery of hydrogen halides from gases using an electrochemical membrane and, more particularly, to a method and apparatus comprising an electrochemical halide recovery cell which allows the recycling of waste hydrogen halide streams into refreshed hydrogen halide or elemental halide.

2. Prior Art

Electrochemical techniques previously have been employed in fuel cells for the separation of carbon dioxide from closed environments. The known processes of the prior art are, however, inoperable at extremely high temperatures, such as in the 150° C. to 1000° C. range. At high temperatures, for example as commonly encountered in industrial stack gases, the known techniques for removing water soluble gases, such as halides, is through water scrubbers. Water scrubbers are expensive to install and maintain, normally requiring chemical additives to improve absorption, and often resulting in liquid-sludge disposal problems. Water scrubbers also have high energy requirements in that the stack gas must be reheated before being released to the environment. Additionally, recovery of elemental halides is difficult and expensive using known methods.

The use of molten salt electrolytes, specifically a lithium chloride-potassium chloride mixture, to recover a halide, specifically chlorine, from a gas, specifically, hydrogen chloride, has been reported in Yoshizawa, S. et al., 1 J. Appl. Electrochem. 245–251 (1971). The Yoshizawa method recovers hydrogen and chlorine by passing hydrogen chloride gas through a carbon pipe to a gas diffusion-type porous carbon cathode, which is immersed in a molten salt of lithium chloride-potassium chloride. A graphite anode is immersed in the same electrolyte. The hydrogen chloride is electrolyzed and hydrogen is obtained from the cathode and chlorine is obtained from the anode. The cell is operated at 400° C.

A method and apparatus for the electrochemical separation and concentration of sulfur-containing gases from gas mixtures is disclosed and claimed in this inventor's U.S. Pat. No. 4,246,081. The '081 patent discloses an electrochemical cell similar to the cell disclosed in this specification. However the '081 patent cell is configured to remove sulfur and it was not apparent to configure the cell for the removal and recovery of halides, nor to even use the cell for the removal and recovery of halides.

Although the basic idea of using an electrochemical cell for the concentration of certain specific gases is known, electrochemical cells have not been known or considered for use in concentrating, removing or recovering halides from high temperature gases. In contrast to existing methods and apparatuses for dealing with waste hydrogen halides, such as neutralization and disposal or recycling by catalytic means, the present cell utilizes an electrochemical membrane for recycling. The method for operating the electrochemical cell involves only one step and is much more economical and environmentally sound than the existing methods and apparatuses. It is to this use that the present invention is directed.

SUMMARY OF THE INVENTION

Briefly described, in a first preferred form the present invention comprises a method of removing halides from a gas mixture at a temperature of about 150° C. or above. The method comprises the steps of:

a. providing an electrochemical cell having an inert cathode and an inert anode;

b. providing the cell with an electrolyte which is molten at temperatures above about 150° C. selected from the group comprising alkali metal halides;

c. raising the temperature of the cell to at least 150° C. whereby the electrolyte is in its molten state;

d. effecting current flow between the cathode and the anode;

e. directing the gas mixture past the cathode where oxidation of the halide occurs and halide anions are formed which migrate toward the anode and are converted to gaseous species, whereby halide gases are evolved at the anode.

In another preferred form, the present invention comprises an electrochemical cell for removing halides from a gas mixture at a temperature of about 150° C. or above. The electrochemical cell comprises a first cell housing and a second cell housing. The cell further includes a cathode associated with the first cell housing and an anode associated with the second cell housing. The cell also includes a porous ceramic membrane between the first cell housing and the second cell housing, separating the first cell housing from the second cell housing. The cell also includes an electrolyte within the porous ceramic membrane which is molten at temperatures above about 150° C.

In yet another preferred form, the present invention comprises a bipolar array of electrochemical cells for removing halides from a gas mixture at a temperature of about 150° C. or above. The array includes a plurality of electrochemical cells arranged in series (electrically). Each of the cells comprises an electrolyte-filled membrane having first and second sides, a cathode held in electrical contact with the first side of the membrane, and an anode held in electrical contact with the second side of the membrane. Each cell also includes a cathode gas flow channel connected to the cathode opposite the membrane, and an anode gas flow channel connected to the anode opposite the membrane. At least two such cells are connected to one another by an electrically conductive cell interconnect to form an array of cells.

It is therefore an object of the present invention to provide an electrochemical process and device for the recovery and removal of halides from high temperature gas mixtures using electrochemical membrane technology.

It is another object of the present invention to provide an electrochemical process and device for the recovery and removal of halides from high temperature gas mixtures which allows for the recycling of waste hydrogen halide streams into refreshed hydrogen halide.

It is another object of the present invention to provide an electrochemical process and device for the recovery and removal of halides from high temperature gas mixtures which allows for the recycling of waste hydrogen halide streams into elemental halide.

Another object of the invention is to provide an electrochemical process for the recovery and removal of halides from high temperature gas mixtures which is more economical to operate than conventional methods.

Yet another object of the invention is to provide an electrochemical process and device for the recovery and removal of halides from high temperature gas mixtures which are more effective in recovering the removed gases in forms more easily stored and sold, thereby making recovery of the removed gas more feasible.

DETAILED DESCRIPTION OF THE PREFERRED EMBODIMENTS

Figure 1:
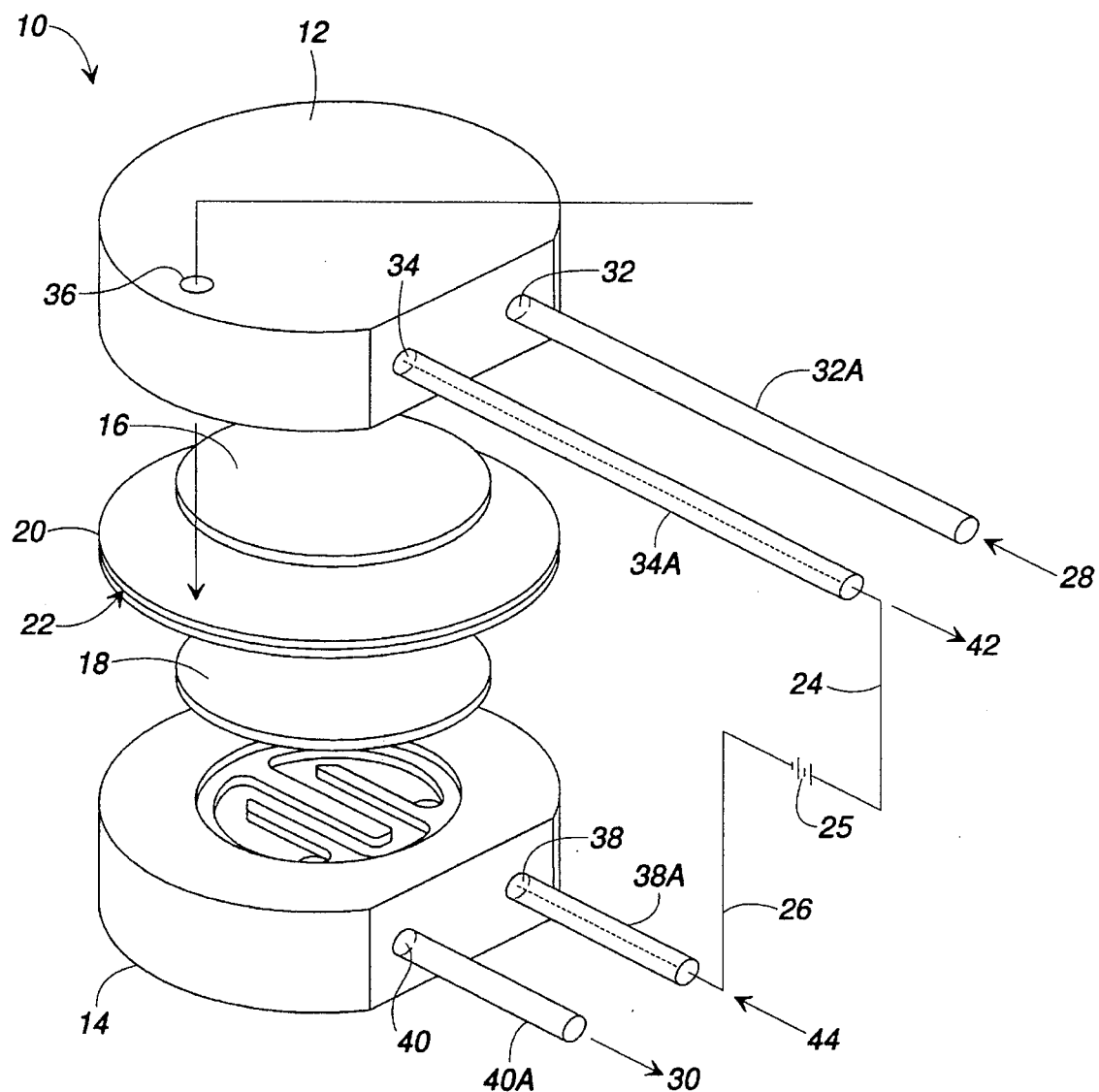
FIG. 1 is an exploded view of an electrochemical cell according to a preferred form of the present invention.

Referring now to FIG. 1, the present electrochemical cell apparatus 10 comprises two half cell housings, a waste stream housing 12 and a sweep stream housing 14, each fitted with a highly porous electrode 16, 18 and separated by a porous ceramic membrane 20 saturated in a eutectic mixture of molten salt 22. Waste stream housing 12 is fitted with the cathode electrode 16 and sweep stream housing 14 is fitted with the anode electrode 18. A conductive non-reactive material such as reticulated vitreous carbon is used as the material for electrodes 16, 18. The electrodes 16, 18 are preferably fitted with gold electrical leads (unshown) using a graphite cement. The ceramic membrane 20 acts to separate the waste hydrogen halide (the waste stream 28) from the elemental halide (the sweep stream 30). The molten salt 22 acts both to form a wet seal at each half cell housing 12, 14 and for ion transport from the cathode 16 to the anode 18.

Waste stream housing 12 comprises a plurality of ports 32, 34, 36 communicating with the exterior of the cell 10. Conduits 32A, 34A are in communication with the respective ports 32, 34. The waste stream 28 containing the halide to be recovered is introduced to the cell 10 through conduit 32A and port 32. After the halide has been removed from the waste stream 28, the polished waste stream 42 exits the cell 10 through port 34 and conduit 34A. Additional molten salt electrolyte 22 can be added to the cell 10 through port 36.

Sweep stream housing 14 comprises a plurality of ports 38, 40 communicating with the exterior of the cell 10. Conduits 38A, 40A are in communication with the respective ports 38, 40. The pure sweep stream 44 (prior to recovering the halide) is introduced to the cell 10 through conduit 38A and port 38. After the halide has been removed from the waste stream 28 by the pure sweep stream 44, the halide-enriched sweep stream 30 exits the cell 10 through port 40 and conduit 40A.

Disposed centrally of the cell 10 is an electrolyte tile 22 which holds the electrolyte matrix and the electrolyte material. Tile 22 preferably is formed from a ceramic or other highly porous inert material which is stable at high temperatures. Located adjacent to and in close contact with tile 22 is the porous cathode of the cell which is designated by the numeral 16. Cathode 16 can be held in place by a porous grid (unshown), or by shelf 48, as is more fully described below. The anode of the cell is designated by the numeral 18 and is also in intimate contact with electrolyte tile 22. The anode can be held in place by a second porous grid (unshown), or by the shelf and flow path arrangement described below.

In one embodiment, lead lines (unshown), extending through cell housings 12, 14 are in electrical contact with the anode 18 and cathode 16 and are coupled with an external source of electrical energy or control.

Figure 2:
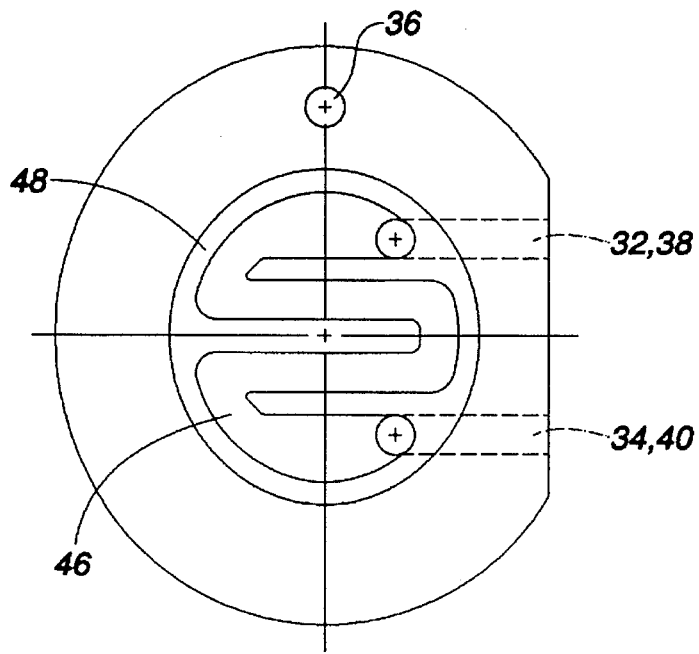
FIG. 2 is a top view of one of the half cell housings of the electrochemical cell shown in FIG. 1.
Figure 3:
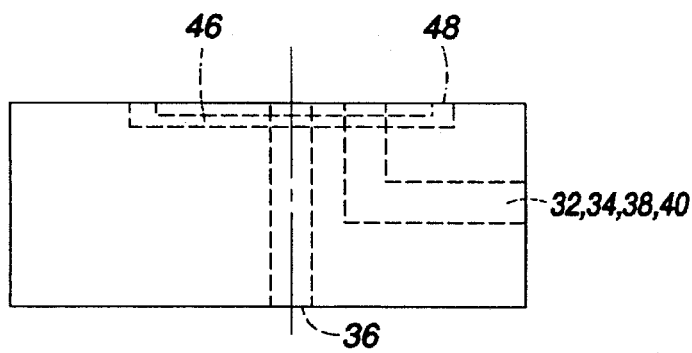
FIG. 3 is a side view of the half cell housing shown in FIG. 2.
Figure 4:
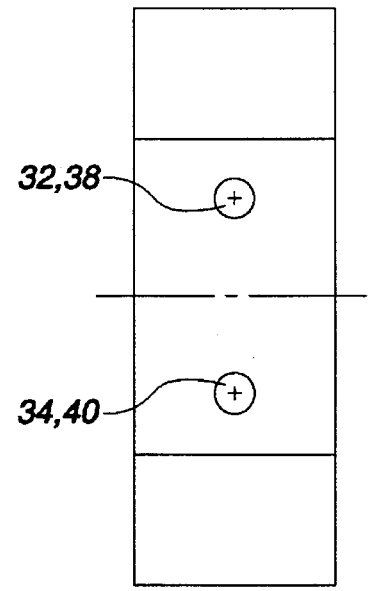
FIG. 4 is a front view of the half cell housing shown in FIG. 2.

Referring now to FIGS. 2, 3, and 4, each half cell housing 12, 14 has a generally similar configuration. Cell housings 12, 14 are generally solid components comprising flow path 46 through which either the waste stream 28 or the sweep stream 30 flow, respectively. Flow path 46 is formed in the surface of the one cell housing 12, 14 which, when the cell 10 is in its operational mode, is closest to the other cell housing 14, 12, with the ceramic membrane 20 therebetween. Flow path 46 typically is serpentine so as to allow the most transfer of halide from the waste stream 28 to the sweep stream 30.

Shelf 48 is located immediately above flow path 46 and is used to support the respective electrode 16, 18. Cathode 16 is supported by shelf 48 formed on waste cell housing 12 and anode 18 is supported by shelf 48 formed on sweep cell housing 14. Shelf 48 should have approximately the same height as the thickness of electrodes 16, 18 so that electrodes 16, 18 will fit snugly within housings 12, 14 respectively.

Ports 32, 34, 38, 40 allow communication between flow path 46 and the exterior of the cell 10. Port 32 allows communication with one end of flow path 46 from the exterior of the waste cell housing 12 and port 34 allows communication with the other end of flow path 46 from the exterior of the waste cell housing 12. Likewise, port 38 allows communication with one end of flow path 46 from the exterior of the sweep cell housing 14 and port 40 allows communication with the other end of flow path 46 from the exterior of the sweep cell housing 14. Port 36 allows communication between the ceramic membrane 20 and the exterior of cell 10, and can be provided in either cell housing 12, 14.

Figure 5:
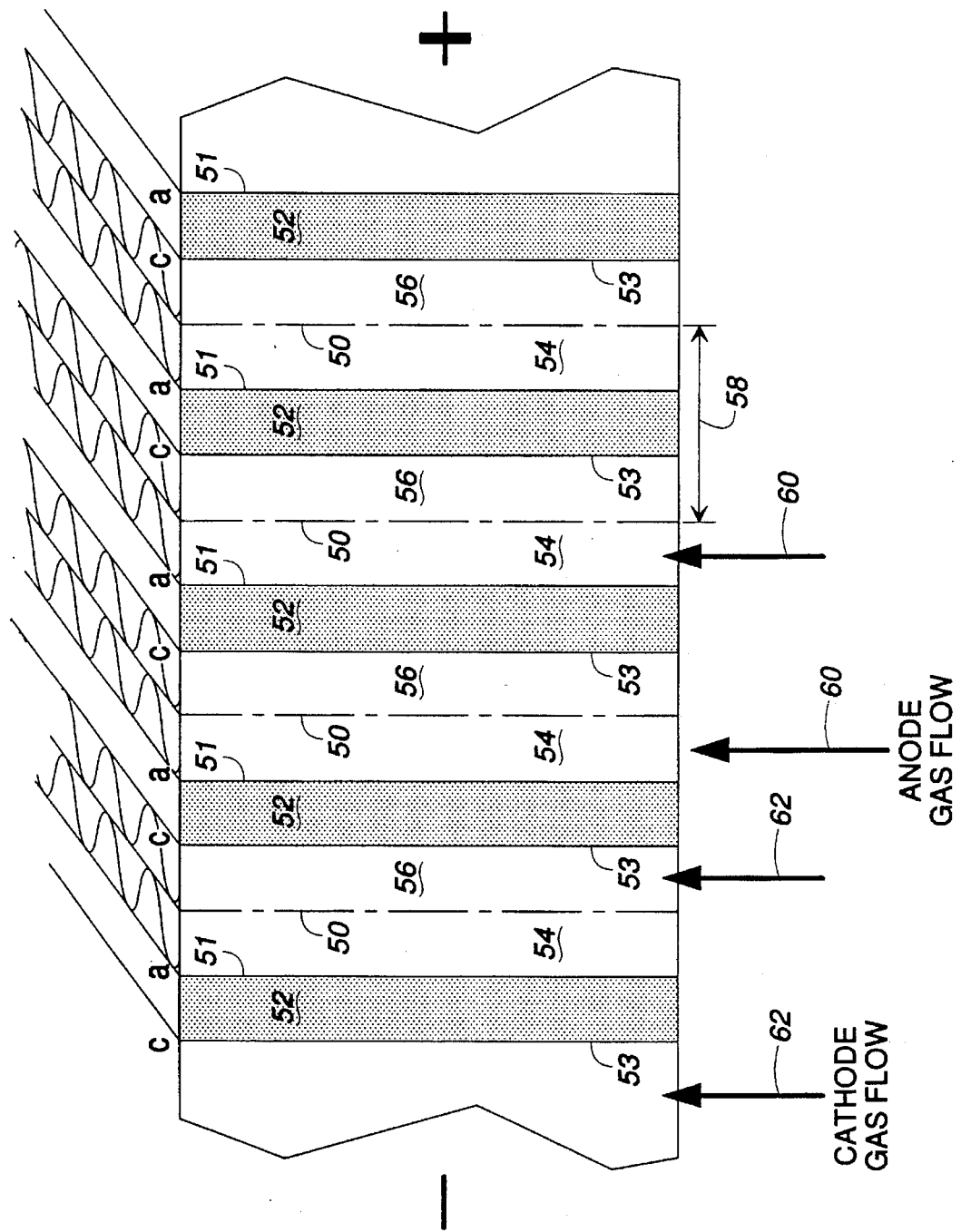
FIG. 5 shows a partial sectional view of another embodiment of the present invention having cells stacked in a bipolar series array with parallel flow.

FIG. 5 shows, in partial sectional view, an embodiment of the present invention having multiple cells, each cell substantially as described above, stacked in a bipolar series (electrically) array with parallel flow of the anode gas and the cathode gas. Individual cells 58 are connected by cell interconnects 50. Cell interconnects 50 are electrically conductive and impermeable to the anode and cathode gasses, and are preferably fabricated from graphite. Each cell comprises an electrolyte-filled membrane 52, centrally disposed, in close registration, between an anode 51 and a cathode 53.

Each cell 58 further comprises an anode gas flow channel 54 and a cathode gas flow channel 56. Gas flow channels 54, 56 are preferably formed from corrugated graphite, vitreous carbon or carbon. Anode gas flow channel 54 is held in close registration and is in electrical contact with anode 51 on one side, and with a cell interconnect 50 on the other. Cathode gas flow channel 56 is held in close registration and in electrical contact with cathode 53 on one side, and with another cell interconnect 50 on the other.

Because the cell interconnects 50 are in electrical contact on one side with the anode gas flow channel 54 of one cell, and on the other side with cathode gas flow channel 56 of a neighboring cell, the stacked cells act as a series array (electrically, the cells are in series).

Anode gas flow 60 is introduced, preferably through an anode gas manifold (unshown), to the anode gas flow channel 54, and flows therethrough. Anode gas flow 60 is equivalent to sweep stream 44 described above in relation to the individual cell. Cathode gas flow 62 is, likewise, introduced to the cathode gas flow channel 56 through an unshown cathode gas manifold, and is equivalent to the above-described waste stream 28. Anode gas flow 60 and cathode gas flow 62 can flow in the same direction, as shown in FIG. 5, or can operate in cross flow.

For improved removal and recovery of halides, two or more of the above-described arrays may be operated in series, with the effluent gas flows from one array being introduced as the influent feed to the second array. As is known in the art, the different concentrations of halides in the two arrays will require that the electrical operating parameters of each array be adjusted accordingly.

The present invention is useful for the recovery of halides from hydrogen halide gases. In particular, the present cell is useful for the recovery of chlorine from hydrogen chloride gas and for the recovery of bromine from hydrogen bromide gas.

The molten salt electrolyte can be any mixture of alkali metal halide salts. In particular, using lithium, potassium, sodium, cesium and mixtures thereof as the electrolyte has produced the most economical results. The electrolyte can be made prior to forming the cell by selecting one or a mixture of suitable electrolyte materials, mixing them if necessary to form the electrolyte, and placing the electrolyte in the cell. Alternatively, the electrolyte can be made in situ in the cell itself by placing one or a mixture of suitable electrolyte materials in the cell prior to operation. As the cell operates at a temperature above the melting point of the electrolyte, as the electrolyte material(s) melts, if more than one electrolyte material is used, the materials will mix.

Any inert porous material may be used as the porous ceramic membrane 20. In particular, using silica ($SiO_2$), magnesia (MgO), boron nitride (BN), silicon nitride (SiN), silicon carbide (SIC) or similar inert ceramics or mixtures thereof as the porous ceramic membrane has produced the most economical results. Typically, the porous ceramic membrane is formed by tape casting, cold pressing or other known forming procedures. The membrane may be formed with or without electrolyte present in the interstices.

Any conductive non-reactive material can be used for the electrodes 16, 18. For example, graphite or other forms of carbon, as well as conductive ceramics and metals, are suitable. Porous vitreous carbon electrodes have been selected as the preferred electrodes because of their unexpected ability to withstand the temperatures achieved in the cell while still being able to maintain structural integrity. Other porous, conductive, non-reactive ceramic materials do not have this ability. In fact, it is surprising and unexpected that porous vitreous carbon does have this ability.

The cell housings 12, 14 can be made of any nonporous inert ceramic material, or graphite. The preferred materials for the cell housings are alumina ($Al_2O_3$), boron nitride (BN), zirconia ($ZrO_3$), or similar inert completely densified ceramic materials.

The process of the present invention encompasses a method of removing halides from gases utilizing electrochemical cell 10, or a stacked bipolar array of such cells. To this end, an electrolyte is selected which will provide anions compatible with those formed by the halides at the cathode of the cell. Thus in the case of bromine, an alkali metal salt is selected for the electrolyte. The electrolyte also needs to be selected with consideration for providing unreactive stable cations at temperatures above 150° C. The alkali metals are particularly applicable because they meet the foregoing criteria and are also readily available. Preferred electrolytes are mixtures of potassium, sodium, lithium and cesium halides. Suitable matrices for the electrolyte include MgO and $SiO_2$. Other matrix materials may be utilized if suitably inert and stable at the high temperature encountered. The salt mixtures have melting points from 200°–400°, making them suitable for operation in this temperature range.

In one form of the invention the current flow between cathode 24 and anode 26 is effected by an external power source 25 connected across leads 24, 26. The halide containing waste gas 28 is directed into the cell 10 through conduit 32A and exits through conduit 34A. As the waste gas 28 comes into intimate contact with cathode 16 the following reactions will take place:

The electrochemical cell follows these half cell reactions. At the cathode:

(1) $2HX + 2e^- \rightarrow 2X^- + H_2$ (where x is either Br or Cl) 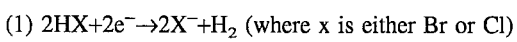

At the anode:

(2) $2X^- \rightarrow 2e^- + X_2$; or (without a supply of $H_2$) 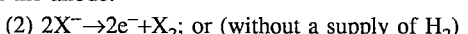

(3) $2X^- + H_2 \rightarrow 2HX$ (with a supply of $H_2$) 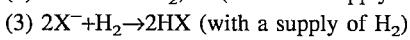

where X represents the halide species. Combination of the two half cell reactions yields the following full cell reaction:

(4) $2HX \rightarrow H_2 + X_2$; or 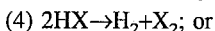

(5) 2HX (mixture) → 2HX (pure) 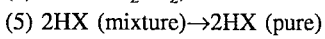

The end product of the electrolysis process evolves through conduits 40A for disposal or further processing. The concentrated halide gas liberated at the anode 18 can be utilized to manufacture other useful products, or used as is. The concentrated gas has been found to be many times the concentration of halide waste stream 28. Since the system is operated without the large amounts of water required in scrubbers, operating efficiency is greatly increased over conventional processes and there is no sludge disposal problem.

In an alternative operation of the invention process, it was found that cell 10 may be changed from a driven to a spontaneous cell. To this end, the electrical leads 24, 26 are simply connected together, bypassing the external power source 25 referred to above or they may be connected through a current controller. Current flow is effected by passing $H_2$ or other reducing gas in through one of conduits 32A, 34A and out through the other 34A, 32A. The reactions at the cathode remain as previously described. Partial dissolution of some electrode materials may provide an internal current path with precludes the use of an external current path or control.

The process of the invention can also be utilized to remove halides from a gas mixture up to 1000° C. In this case an alkali metal salt is selected for the electrolyte. An external power source is utilized in combination with a reducing gas such as $H_2$ at the anode. The halides are converted at the cathode to halide ions which will then be concentrated and re-converted at the anode to either elemental halides or refreshed halides. Care must be taken to select electrode materials which will not react with any of the ions or molecules present in the environment.

The above description sets forth the best mode of the invention as known to the inventor at this time, and the above Examples are for illustrative purposes only, as it is obvious to one skilled in the art to make modifications to this process and apparatus without departing from the spirit and scope of the invention and its equivalents as set forth in the appended claims.

What is claimed is:

1. A method of removing halides from a gas mixture at a temperature of about 150° C. or above, said method comprising the steps of:

a. providing an electrochemical cell having a first and a second cell housing selected from the group consisting of graphite, alumina, boron nitride, and zirconia, an inert cathode and an inert anode;

b. providing said cell with a porous ceramic membrane filled with an electrolyte which is molten at temperatures above about 150° C. selected from the group comprising alkali metal halides;

c. raising the temperature of said cell to at least 150° C. whereby said electrolyte is in its molten state;

d. effecting current flow between said cathode and said anode;

e. directing the gas mixture past said cathode where oxidation of the halide occurs and halide anions are formed which migrate toward said anode and are converted to gaseous species, whereby halide gases are evolved at said anode.

2. A method as claimed in claim 1, wherein said step of directing said gas mixture past said cathode results in the formation of $X^-$ ions at the cathode.

3. A method as claimed in claim 2, wherein said step of providing an electrolyte comprises providing at least one alkali metal salt.

4. A method as claimed in claim 1, wherein said step of effecting current flow comprises providing an external source of electrical energy across said anode and cathode.

5. A method as claimed in claim 1, wherein said step of effecting current flow comprises passing a reducing gas past said anode.

6. A method as claimed in claim 5, wherein said step of passing a reducing gas comprises passing hydrogen past said anode.

7. A method as claimed in claim 1, wherein said electrolyte is selected from the group consisting of lithium, potassium, sodium, cesium, and mixtures thereof.

8. A method as claimed in claim 7, wherein said ceramic membrane is selected from the group consisting of silica, magnesia, boron nitride, silicon nitride, and silicon carbide.

9. A method as claimed in claim 7, wherein said anode and said cathode are porous vitreous carbon.

10. A method of removing halides from a gas mixture at a temperature of about 150° C. or above, utilizing an electrochemical cell characterized by a first and a second cell housing selected from the group consisting of graphite, alumina, boron nitride, and zirconia, an inert anode, and an inert cathode and having a porous ceramic membrane filled with an electrolyte which is molten at operating temperatures, said electrolyte being selected from the group comprising alkali metal halides, said method comprising the steps of:

a. raising the temperature of said cell to approximately 150° C. whereby said electrolyte is in its molten state;

b. effecting current flow between said cathode and said anode;

c. directing said gas mixture past said cathode where oxidation of the halide occurs and halide-containing anions are formed which migrate toward said anode and are converted to gaseous species, whereby concentrated halide gases are evolved at said anode.

11. A method as set forth in claim 10, further composing the step of recovering said gas evolving at said anode.

12. A method as set forth in claim 11, wherein said step of effecting current flow comprises providing an external source of electrical energy across said anode and cathode.

13. A method as set forth in claim 11, wherein said step of effecting current flow comprises passing a reducing gas past said anode.

14. A method as claimed in claim 10, wherein said electrolyte is selected from the group consisting of lithium, potassium, sodium, cesium, and mixtures thereof.

15. A method as claimed in claim 14, wherein said ceramic membrane is selected from the group consisting of silica, magnesia, boron nitride, silicon nitride, and silicon carbide.

16. A method as claimed in claim 15, wherein said anode and said cathode are porous vitreous carbon.

17. An electrochemical cell for removing halides from a gas mixture at a temperature of about 150° C. or above, comprising:

a. a first cell housing and a second cell housing selected from the group consisting of graphite, alumina, boron nitride, and zirconia;

b. a cathode associated with said first cell housing and an anode associated with said second cell housing;

c. a porous ceramic membrane between said first cell housing and said second cell housing separating said first cell housing from said second cell housing; and d. an electrolyte within said porous ceramic membrane which is molten at temperatures above about 150° C.

18. A cell as claimed in claim 17, further comprising means for introducing the gas mixture to the electrochemical cell through said first cell housing.

19. A cell as claimed in claim 18, further comprising means for removing the recovered halides from the electrochemical cell through said second cell housing.

20. A cell as claimed in claim 17, further comprising means for electrically connecting said anode to said cathode.

21. A cell as claimed in claim 17, wherein said electrolyte is selected from the group consisting of lithium, potassium, sodium, cesium, and mixtures thereof.

22. A cell as claimed in claim 21, wherein said ceramic membrane is selected from the group consisting of silica, magnesia, boron nitride, silicon nitride, and silicon carbide.

23. A method as claimed in claim 17, wherein said anode and said cathode are porous vitreous carbon.

24. A bipolar array of electrochemical cells for removing halides from a gas mixture at a temperature of about 150° C. or above, comprising at least two electrochemical cells arranged in electrical series, each of said cells comprising:

a. an electrolyte-filled porous ceramic membrane having first and second sides;

b. a first cell housing and a second cell housing selected from the group consisting of graphite, alumina, boron nitride, and zirconia;

c. a cathode held in electrical contact with said first side of said membrane;

d. an anode held in electrical contact with said second side of said membrane;

e. a cathode gas flow channel connected to said cathode opposite said membrane; and f. an anode gas flow channel connected to said anode opposite said membrane, said at least two cells being connected to one another by an electrically conductive cell interconnect.

* * * * *